(12) United States Patent
Haller et al.

(10) Patent No.: US 9,266,452 B2
(45) Date of Patent: Feb. 23, 2016

(54) VEHICLE VIBRATION DEVICE FOR VEHICLE SEATS OR VEHICLE CABS

(75) Inventors: Erwin Haller, Birgland (DE); Jens Kolb, Koenigstein (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 13/312,193

(22) Filed: Dec. 6, 2011

(65) Prior Publication Data

US 2012/0145875 A1 Jun. 14, 2012

(30) Foreign Application Priority Data

Dec. 8, 2010 (DE) .......................... 10 2010 053 752

(51) Int. Cl.
*B60N 2/50* (2006.01)
*B60N 2/39* (2006.01)
*B60N 2/52* (2006.01)

(52) U.S. Cl.
CPC .. *B60N 2/50* (2013.01); *B60N 2/39* (2013.01); *B60N 2/502* (2013.01); *B60N 2/506* (2013.01); *B60N 2/507* (2013.01); *B60N 2/522* (2013.01); *B60N 2/525* (2013.01); *B60N 2/527* (2013.01)

(58) Field of Classification Search
CPC .......... B60N 2/50; B60N 2/502; B60N 2/503; B60N 2/506; B60N 2/507; B60N 2/509; B60N 2/54; B60N 2/544; B60N 2/045; B60N 2/39
USPC .................. 297/314, 344.11, 344.12–344.16; 248/418, 420, 395, 419, 393, 423, 394, 248/562, 638, 678, 618, 636, 424; 180/327, 180/89.12, 89.13, 89.16, 89.18; 296/65.02, 296/65.09
See application file for complete search history.

(56) References Cited

U.S. PATENT DOCUMENTS

| | | | |
|---|---|---|---|
| 203,739 | A | 5/1878 | Kilburn |
| 1,544,248 | A | 6/1925 | Liebl |
| 1,607,164 | A | 11/1926 | Leipert et al. |
| 1,945,801 | A | 2/1934 | Briggs |
| 1,948,476 | A | 2/1934 | Saurer |
| 2,489,981 | A | 3/1946 | Rose |
| 2,559,105 | A | 7/1951 | Banning, Jr. |
| 2,607,397 | A | 8/1952 | Schneider |

(Continued)

FOREIGN PATENT DOCUMENTS

| | | |
|---|---|---|
| DE | 1480465 | 1/1970 |
| DE | 1405350 | 3/1970 |

(Continued)

OTHER PUBLICATIONS

Office Action prepared by the German Patent Office on Aug. 12, 2010, for Application No. 102010053752.7.

(Continued)

*Primary Examiner* — Jonathan Liu
*Assistant Examiner* — Guang H Guan
(74) *Attorney, Agent, or Firm* — Sheridan Ross P.C.

(57) ABSTRACT

The invention concerns a vehicle vibration device for a vehicle seat or a vehicle cab with a lower part and an upper part sprung mounted in relation to the lower part by at least one damper device, wherein the upper part is mounted suspended on the lower part so that on occurrence of vibrations between the upper part and lower part, the upper part can swivel about a fictitious or real axis arranged below the upper part and extending in the vehicle width direction or vehicle length direction.

15 Claims, 8 Drawing Sheets

(56) References Cited

U.S. PATENT DOCUMENTS

| | | | |
|---|---|---|---|
| 2,682,931 A | 7/1954 | Young | |
| 2,686,667 A | 8/1954 | Willison et al. | |
| 2,933,127 A | 4/1960 | Brewster | |
| 2,982,336 A | 5/1961 | Minici | |
| 3,006,594 A * | 10/1961 | Gruendler | 248/424 |
| 3,046,053 A | 7/1962 | Pearlstine | |
| 3,134,568 A | 5/1964 | Carson | |
| 3,208,085 A | 9/1965 | Grimshaw | |
| 3,298,654 A | 1/1967 | Dome | |
| 3,436,042 A | 4/1969 | Van Goubergen | |
| 3,578,376 A | 5/1971 | Hasegawa et al. | |
| 3,608,855 A | 9/1971 | Osenberg | |
| 3,697,128 A | 10/1972 | Strien et al. | |
| 3,724,603 A | 4/1973 | Shiomi et al. | |
| 3,752,432 A | 8/1973 | Lowe | |
| 3,756,556 A | 9/1973 | Georgi | |
| 3,765,676 A | 10/1973 | Bearson et al. | |
| 3,788,697 A | 1/1974 | Barton et al. | |
| 3,802,737 A | 4/1974 | Mertens | |
| 3,826,457 A | 7/1974 | Huot de Longchamp | |
| 3,847,338 A | 11/1974 | Adams | |
| 3,882,956 A | 5/1975 | Plegat | |
| 3,883,172 A | 5/1975 | Barton et al. | |
| 3,917,209 A | 11/1975 | Adams | |
| 3,982,718 A | 9/1976 | Folkenroth et al. | |
| 4,002,315 A | 1/1977 | Van Goubergen | |
| 4,022,411 A | 5/1977 | Rumsey | |
| 4,072,287 A | 2/1978 | Swenson et al. | |
| 4,125,242 A | 11/1978 | Meiller et al. | |
| 4,183,492 A | 1/1980 | Meiller | |
| 4,257,626 A | 3/1981 | Adomeit | |
| 4,273,213 A | 6/1981 | Munz | |
| 4,286,765 A | 9/1981 | Delgleize et al. | |
| 4,349,167 A | 9/1982 | Reilly | |
| 4,350,317 A | 9/1982 | Aondetto | |
| 4,440,441 A | 4/1984 | Marrujo et al. | |
| 4,461,444 A | 7/1984 | Grassl et al. | |
| 4,487,383 A | 12/1984 | Mazelsky | |
| 4,500,076 A | 2/1985 | Rova | |
| 4,519,591 A | 5/1985 | Bush et al. | |
| 4,529,158 A * | 7/1985 | Sautter, Jr. | 248/393 |
| 4,678,155 A | 7/1987 | Carter | |
| 4,679,760 A | 7/1987 | Dotzler et al. | |
| 4,685,731 A | 8/1987 | Migut | |
| 4,700,921 A | 10/1987 | Holbrook | |
| 4,714,227 A | 12/1987 | Holm et al. | |
| 4,784,434 A | 11/1988 | Iwami | |
| 4,842,257 A | 6/1989 | Abu-Isa et al. | |
| 4,856,763 A | 8/1989 | Brodersen et al. | |
| 4,859,148 A | 8/1989 | Hibyan | |
| 4,911,381 A | 3/1990 | Cannon et al. | |
| 4,927,119 A | 5/1990 | Frost | |
| 4,954,051 A | 9/1990 | Smith et al. | |
| 4,958,812 A | 9/1990 | Wolf et al. | |
| 5,004,206 A | 4/1991 | Anderson | |
| 5,014,960 A | 5/1991 | Kimura | |
| 5,022,707 A * | 6/1991 | Beauvais | B60N 2/4212 |
| | | | 248/371 |
| 5,042,783 A | 8/1991 | Ciolczyk et al. | |
| 5,054,753 A | 10/1991 | Polus | |
| 5,087,503 A | 2/1992 | Meatto | |
| 5,123,625 A | 6/1992 | Spaltofski | |
| 5,127,699 A | 7/1992 | Maezawa et al. | |
| 5,194,111 A | 3/1993 | Meatto | |
| 5,211,369 A | 5/1993 | Hoerner | |
| 5,221,071 A | 6/1993 | Hill | |
| 5,222,709 A | 6/1993 | Culley, Jr. et al. | |
| 5,251,864 A | 10/1993 | Itou | |
| 5,324,095 A | 6/1994 | Yamauchi | |
| 5,331,750 A | 7/1994 | Sasaki et al. | |
| 5,338,090 A | 8/1994 | Simpson et al. | |
| 5,344,210 A | 9/1994 | Marwan et al. | |
| 5,358,210 A | 10/1994 | Simon et al. | |
| 5,368,118 A * | 11/1994 | Hoefle | 180/89.12 |
| 5,374,022 A * | 12/1994 | Gilmer, Jr. | B63B 29/04 |
| | | | 248/396 |
| 5,437,494 A | 8/1995 | Beauvais | |
| 5,449,218 A | 9/1995 | Beauvais et al. | |
| 5,531,404 A | 7/1996 | Marechal | |
| 5,553,911 A | 9/1996 | Bodin et al. | |
| 5,555,501 A | 9/1996 | Furihata et al. | |
| 5,605,372 A * | 2/1997 | Al-Abdullateef | B60N 2/4214 |
| | | | 297/216.1 |
| 5,622,406 A * | 4/1997 | Meschkat | B60N 2/0284 |
| | | | 248/395 |
| 5,632,208 A | 5/1997 | Weber | |
| 5,651,585 A | 7/1997 | Van Duser | |
| 5,653,505 A * | 8/1997 | Holobaugh, Jr. | 297/273 |
| 5,657,950 A | 8/1997 | Han et al. | |
| 5,676,424 A | 10/1997 | Winkelhake | |
| 5,730,492 A | 3/1998 | Warrick et al. | |
| 5,743,592 A | 4/1998 | Bedouch | |
| 5,758,859 A | 6/1998 | Gonzalez | |
| 5,782,533 A * | 7/1998 | Fischer | B60N 2/06 |
| | | | 248/421 |
| 5,871,198 A | 2/1999 | Bostrom et al. | |
| 5,871,257 A | 2/1999 | Dundes, Sr. | |
| 5,899,288 A | 5/1999 | Schubert et al. | |
| 5,967,604 A | 10/1999 | Yoshida | |
| H001833 H | 2/2000 | Hoppel et al. | |
| 6,048,034 A * | 4/2000 | Aumont | B60N 2/1803 |
| | | | 297/216.1 |
| 6,056,362 A * | 5/2000 | de la Haye | 297/314 |
| 6,244,656 B1 * | 6/2001 | Mueller | B60N 2/4228 |
| | | | 297/216.13 |
| 6,286,821 B1 | 9/2001 | Schaffer | |
| 6,309,020 B1 | 10/2001 | Niikura et al. | |
| 6,354,556 B1 | 3/2002 | Ritchie et al. | |
| 6,412,864 B1 | 7/2002 | Larson | |
| 6,454,351 B2 * | 9/2002 | Motozawa | B60N 2/4221 |
| | | | 296/68.1 |
| 6,478,102 B1 | 11/2002 | Puterbaugh et al. | |
| 6,554,359 B2 | 4/2003 | Kohl et al. | |
| 6,582,015 B2 | 6/2003 | Jessup et al. | |
| 6,595,570 B2 | 7/2003 | Susko | |
| 6,725,983 B2 | 4/2004 | Bell | |
| 6,758,294 B2 | 7/2004 | Peddycord et al. | |
| 6,773,049 B2 | 8/2004 | Rupiper et al. | |
| 6,857,674 B2 | 2/2005 | Chareyre | |
| 6,935,693 B2 | 8/2005 | Janscha et al. | |
| 7,017,888 B2 | 3/2006 | Platner et al. | |
| 7,044,553 B2 | 5/2006 | Ropp | |
| 7,077,226 B2 | 7/2006 | Oliver et al. | |
| 7,077,227 B2 | 7/2006 | Oliver et al. | |
| 7,080,881 B2 | 7/2006 | Williamson et al. | |
| 7,185,867 B2 | 3/2007 | Hill et al. | |
| 7,201,367 B2 | 4/2007 | Wietharn | |
| 7,240,754 B2 | 7/2007 | Barta et al. | |
| 7,300,100 B2 | 11/2007 | McLean et al. | |
| 7,331,627 B2 | 2/2008 | Van Den Brink et al. | |
| 7,338,126 B2 | 3/2008 | Ropp | |
| 7,452,019 B1 | 11/2008 | Day | |
| 7,469,861 B2 | 12/2008 | Ferry et al. | |
| 7,478,879 B2 | 1/2009 | Robinson | |
| 7,484,805 B2 | 2/2009 | Baum | |
| 7,568,675 B2 | 8/2009 | Catton | |
| 7,744,149 B2 | 6/2010 | Murray et al. | |
| 7,882,914 B2 | 2/2011 | Scheele et al. | |
| 7,883,135 B2 | 2/2011 | Ravid et al. | |
| 7,886,882 B2 | 2/2011 | Behmenburg et al. | |
| 7,950,726 B2 | 5/2011 | Brown | |
| 7,997,600 B2 | 8/2011 | Haller et al. | |
| 8,061,770 B2 | 11/2011 | Houston et al. | |
| 8,095,268 B2 | 1/2012 | Parison et al. | |
| 8,182,038 B2 | 5/2012 | Haller | |
| 8,186,475 B2 | 5/2012 | Sugden et al. | |
| 8,225,903 B2 | 7/2012 | Dunn | |
| 8,226,163 B1 | 7/2012 | Pearson et al. | |
| 8,261,869 B2 | 9/2012 | Turco et al. | |
| 8,265,832 B2 | 9/2012 | Haller et al. | |
| 8,469,450 B2 | 6/2013 | Wahls et al. | |
| 8,534,646 B2 | 9/2013 | Bauer et al. | |

(56) References Cited

U.S. PATENT DOCUMENTS

| | | | |
|---|---|---|---|
| 8,550,554 B2* | 10/2013 | Asakura | B60N 2/1615 297/216.2 |
| 8,596,721 B2* | 12/2013 | Ozawa | B60N 2/1615 248/421 |
| 8,662,588 B1 | 3/2014 | Delmestri | |
| 2002/0033622 A1 | 3/2002 | Jarnail et al. | |
| 2004/0090100 A1 | 5/2004 | Igarashi | |
| 2005/0051373 A1 | 3/2005 | Bernhardt et al. | |
| 2005/0224269 A1 | 10/2005 | Dahl | |
| 2006/0061022 A1 | 3/2006 | Chang et al. | |
| 2006/0208401 A1 | 9/2006 | Reast | |
| 2006/0237885 A1 | 10/2006 | Paillard et al. | |
| 2008/0164746 A1 | 7/2008 | Dozsa-Farkas | |
| 2008/0197684 A1 | 8/2008 | Ott et al. | |
| 2009/0045000 A1 | 2/2009 | Brown | |
| 2009/0205880 A1* | 8/2009 | Hammonds | 180/6.48 |
| 2009/0284061 A1* | 11/2009 | Maier et al. | 297/344.24 |
| 2010/0006364 A1* | 1/2010 | Koutsky et al. | 180/329 |
| 2010/0117428 A1 | 5/2010 | Deml et al. | |
| 2010/0213345 A1* | 8/2010 | Haller | 248/550 |
| 2010/0276211 A1* | 11/2010 | Kolb et al. | 177/136 |
| 2010/0289312 A1 | 11/2010 | Burr et al. | |
| 2010/0294174 A1* | 11/2010 | Cummins et al. | 108/57.12 |
| 2011/0001342 A1 | 1/2011 | Deml et al. | |
| 2011/0226930 A1 | 9/2011 | Enns et al. | |
| 2011/0233975 A1 | 9/2011 | Mindel et al. | |
| 2011/0278894 A1 | 11/2011 | Lorey | |
| 2012/0025577 A1 | 2/2012 | Kolb | |
| 2012/0032379 A1 | 2/2012 | Kolb | |
| 2012/0043798 A1 | 2/2012 | Haller et al. | |
| 2012/0049602 A1 | 3/2012 | Kaessner | |
| 2012/0091773 A1 | 4/2012 | Lorey | |
| 2012/0133184 A1 | 5/2012 | Himmelhuber | |
| 2012/0145875 A1* | 6/2012 | Haller | B60N 2/39 248/636 |
| 2012/0153551 A1 | 6/2012 | Kolb | |
| 2013/0069409 A1 | 3/2013 | Kolb | |

FOREIGN PATENT DOCUMENTS

| | | |
|---|---|---|
| DE | 1480188 | 3/1970 |
| DE | 2309808 | 9/1973 |
| DE | 2317824 | 10/1973 |
| DE | 7419891 | 10/1974 |
| DE | 2537174 | 8/1975 |
| DE | 77 31 339 U | 1/1978 |
| DE | 2816616 | 10/1979 |
| DE | 141769 | 5/1980 |
| DE | 3003175 | 8/1981 |
| DE | 32 08 680 A1 | 3/1982 |
| DE | 3237167 | 4/1984 |
| DE | 3517345 | 11/1986 |
| DE | 3890533 | 10/1989 |
| DE | 3901898 | 7/1990 |
| DE | 9312640 | 1/1994 |
| DE | 19907658 | 2/1999 |
| DE | 19744199 | 4/1999 |
| DE | 19919697 | 11/2000 |
| DE | 19945841 | 4/2001 |
| DE | 10129127 | 1/2003 |
| DE | 10206223 | 9/2003 |
| DE | 10300876 | 7/2004 |
| DE | 102005028725 | 1/2005 |
| DE | 102005023088 | 6/2006 |
| DE | 60304643 | 4/2007 |
| DE | 102006030008 | 4/2007 |
| DE | 102008063812 | 4/2007 |
| DE | 112006002984 | 10/2008 |
| DE | 102007027320 | 1/2009 |
| DE | 102008023120 | 6/2010 |
| DE | 102010051326 | 3/2012 |
| EP | 0284365 | 9/1988 |
| EP | 1 400 398 B1 | 3/2004 |
| EP | 1577156 | 9/2005 |
| EP | 1652724 | 5/2006 |
| FR | 2352686 | 12/1977 |
| GB | 1401881 | 8/1975 |
| GB | 1432614 | 4/1976 |
| GB | 1587637 | 4/1981 |
| GB | 2438090 | 11/2007 |
| WO | WO 92/04 224 A1 | 3/1992 |
| WO | WO 92/09451 | 6/1992 |
| WO | WO 98/32627 | 7/1998 |
| WO | WO 03/063650 | 8/2003 |
| WO | WO 2007/058 572 A1 | 5/2007 |

OTHER PUBLICATIONS

Search Report for German Patent Application No. 11192650.7, dated Jan. 3, 2013, 3 pages.
Official Action (no English translation available) for German Patent Application No. 102010053752.7, dated Mar. 11, 2014, 10 pages.

* cited by examiner

VEHICLE VIBRATION DEVICE FOR VEHICLE SEATS OR VEHICLE CABS

CROSS REFERENCE TO RELATED APPLICATIONS

This application claims the benefit of German Patent Application No. 10 2010 053 752.7 filed Dec. 8, 2010, the entire disclosure of each of which is incorporated herein by reference.

FIELD

The invention concerns a vibration device for vehicles, in particular a vehicle vibration device for a vehicle seat or a vehicle cab with a lower part and an upper part sprung mounted in relation to the lower part by means of at least one damper device according to the preamble of claim 1.

BACKGROUND

Vehicle vibration devices, in particular for vehicle seats, are formed such that they constitute an oscillating, sprung mounting between an upper part and a lower part, in this case between a vehicle seat part and a lower part of the vehicle seat subframe. For example a vehicle seat with a seat part can be connected to a lower part, that is attached to the vehicle cab floor or body of the vehicle, by means of scissor arms, wherein between the upper part and the lower part additional springing devices and/or damping devices are arranged in order to absorb by springing a vertically directed vibration introduced from outside into the vehicle seat system.

There are also horizontal vibration devices which serve to spring or damp out vibrations introduced into the vehicle seat system in the horizontal direction. For this the upper part of the vehicle seat is sprung mounted in the horizontal direction in relation to the lower part of the vehicle seat and can absorb by springing vibrations introduced in the horizontal or transverse direction.

Horizontal vibrations introduced into the system of the sprung vehicle seat or sprung vehicle cab frequently occur if a truck in which the vehicle seat or cab is arranged passes with its front wheels through a hollow or over a bump, and as a result the vehicle seat or vehicle cab briefly undergoes a braking or acceleration in the vehicle length direction in relation to the remainder of the vehicle. This is because, inter alia, the driver's weight is moved with a certain inertia, with a time delay or accelerated relative to the movement of the vehicle. A purely horizontal excitation occurs preferably for example in the case of a rigid subframe (unsprung vehicle) and a horizontal thrust, for example of a trailer e.g. by the overrun brake. Travelling over hollows and rocks with the front wheel preferably leads at least partly to a rotation movement about the contact point of the rear wheel with distance r (corresponds to the distance from the contact point to the seat surface). If the rear wheel then rolls over the unevenness, this also leads to a rotational movement about the contact surface or contact point of the front wheel. This thrust is preferably largely absorbed by vertical springing as this is virtually above the excitation point or contact surface of the rear wheel.

Frequently in such horizontally aligned vehicle vibration devices, the problem arises that the vibrations introduced into the system of a vehicle seat or vehicle cab can only be absorbed by springing in the direction parallel to the vehicle floor on which the vehicle seat is arranged. However a vehicle which for example with its front axle passes over a bump or raised road surface unevenness, in particular one or more stones, branches or similar, or through a hollow, does not exclusively undergo a brief change in its speed only in the horizontal direction. Rather, a type of tipping movement of the entire vehicle occurs, possibly associated with a slight deflection about an axis extending in the vehicle width direction.

On such a tipping movement or pitching, previous vehicle seats have the facility to absorb the vibrations introduced by springing as follows:

For the first degree of freedom of vibrations in the vertical direction (Z axis), a vehicle vibration device extending vertically in relation to the vehicle floor is provided between the vehicle seat upper part and the vehicle seat lower part. In addition damping devices can be installed in the vertical direction. For the vibrations introduced in the longitudinal horizontal direction in relation to the vehicle floor, according to the second degree of freedom (X axis) in the vehicle longitudinal axis direction, so-called horizontal vehicle vibration devices are present. For the third degree of freedom (Y axis) in the vehicle width direction, vehicle vibration devices acting in the horizontal direction can be present.

Thus previously three separate vehicle vibration devices have been provided for a total of three degrees of freedom along the X, Y and Z axes of a vehicle. The spring travels required to damp the vibrations introduced are always guided in the direction of the vehicle plane axes. Conventionally such spring travels are limited to around 100 mm extension in the vertical direction. The longitudinal and lateral horizontal spring travels depend on the design and safety requirements of the environment, and may be restricted by access to controls and scissor element settings. Such horizontally acting spring travels are usually limited to +/−25 mm in both the X axis and Y axis directions. A tipping or pitching movement of the vehicle cannot or can only be inadequately compensated by such separately arranged vehicle vibration devices in their spring travels because of the established degrees of freedom of the individual vehicle vibration devices.

SUMMARY

Consequently the present invention is based on the object of providing a vehicle vibration device for a vehicle seat or vehicle cab which provides greater seating comfort for the person riding in the vehicle when passing through a hollow or over a bump.

This object is achieved by the features of claim 1.

One essential point of the invention is that in a vehicle vibration device for a vehicle seat or vehicle cab with a lower part and an upper part that is sprung mounted in relation to the lower part by means of at least one damper device, the upper part is mounted suspended on the lower part so that when vibrations occur between the upper part and the lower part, the upper part can swivel about a fictitious or real axis arranged below the upper part and extending in the vehicle width direction or vehicle length direction. The suspended mounting of the upper part on the lower part and the possible swivel movement about a fictitious or real axis extending in the vehicle width direction or vehicle length direction and arranged below the upper part, can advantageously achieve that on passing through a pothole or over a bump, the pitching or tipping movement performed by the vehicle or a type of roll movement can be compensated by the vehicle vibration device. Insofar as the vehicle for example rides over a bump and thus the front wheels are deflected upwards, where simultaneously a brief braking occurs in the vehicle longitudinal direction i.e. the horizontal direction, a type of tipping or pitching movement of the vehicle occurs which could be compensated by the opposing swivel movement of the upper part and the lower part of the vehicle seat or vehicle cab. This can be supported by damping and springing by means of the damping device and where applicable a further springing device, so that the tipping movement introduced can be damped out vibrationally.

When passing over a bump or rock, the front wheel or front part of the vehicle is thus preferably thrust upward, which can lead to a rotational movement of the vehicle about the contact surface of the rear tyre. The mass inertia of the driver however tries to maintain the movement of the vehicle seat and driver himself translationally. Here a rotational degree of freedom is helpful so that the driver is not forced up by the rotation of the vehicle due to the rising of the vehicle front part.

By establishing a fictitious or real axis about which the swivel movement takes place and which can also be the theoretical axis about which the vehicle body moves rotationally when driving over a bump or through a hollow, such rotative degrees of freedom can be created. A mechanical kinematic for performing a swivel movement according to these rotative degrees of freedom can be accommodated both on the vehicle side i.e. for example in the vehicle floor or vehicle cab floor, and on the seat side i.e. directly in the vehicle seat, so that a real axis or fictitious axis about which the swivel movement is executed is arranged in these parts.

In the present case by such a suspended mounting of the upper part in relation to the lower part i.e. a vehicle seat upper part in relation to a vehicle body part, a vehicle body frame or vehicle seat lower part which is connected with the vehicle cab part, or on use of a vehicle cab in relation to a vehicle frame part, the upper and lower parts are connected together by means of at least one first and one second swivel mounting. Here the first swivel mounting and the second swivel mounting each comprise at least one lever arm, the first end of which is swivellably mounted by means of a first swivel axis on the lower part and the second end of which is swivellably mounted by means of a second swivel axis on the upper part, wherein the second end lies above the first end. This means that the upper part is suspended on the lower part with lever arms hanging down or pointing obliquely down, wherein the lower part for example extends upward at the side to the left and right of the upper part or upward at the side in the front and rear areas of the upper part. Such mounting, insofar as produced with at least two swivel bearings, can execute a swinging movement in the sense of a rotational movement in relation to the fictitious or real axis, wherein advantageously the second swivel axis of the second swivel bearing can be moved within a curved track arranged on the lower part.

This curved track due to its curved form allows guided movement of the upper part i.e. the vehicle seat upper part or vehicle cab, on a rotation movement track, wherein the curvature of this curved track determines the position of the fictitious or real rotation point about which the vehicle seat can swivel. Thus for example the end of this arc-shaped curved track can determine the maximum possible swivel movement of the vehicle seat in relation to the rest of the vehicle when driving through a hollow or over a bump. Also the arc-shaped form of the curved track can determine how lightly or heavily the upper part can move in its rotation movement in relation to a generated swivel movement of the remaining vehicle because of driving through the hollow or over the bump. This means that due to the curvature of this curved track, the vehicle seat can compensate for slight swivel movements of the vehicle not by a opposing controlled rotation movement, but on a strong deflection or swivel movement of the vehicle or pitching of the vehicle in which the second swivel bearing moves further into the end areas of the curve, which in this region has a different curvature, allows more readily an opposing rotation movement to compensate for the swivel movement of the rest of the vehicle.

In a preferred embodiment a first swivel mounting is arranged firstly on upward extending side walls of the lower part in the region of the upper part at the front of the vehicle, and secondly on side attachments on the upper part arranged between the side walls on the left and right sides of the vehicle.

In each case a second swivel bearing is arranged firstly on upward extending side walls of the lower part in the region of the upper part at the rear of the vehicle and secondly on side attachments on the upper part arranged between side walls on the left and right sides of the vehicle. Thus on the left and right sides of a vehicle seat of vehicle cab are arranged two front first swivel bearings and two rear second swivel bearings. The vehicle seat or vehicle cab thus comprises a total of four swivel bearings which allow a rocking suspension of the vehicle seat upper part in relation to the vehicle seat lower part or the vehicle cab in relation to the remainder of the vehicle, in order to allow a rotation movement of the upper part to be provoked.

According to a preferred embodiment which can be viewed in combination with the suspended mounting just described for the performance of a rotation movement in the longitudinal direction of the vehicle and vehicle seat or vehicle cab, the first and second swivel bearings are arranged on the front and rear side walls of the lower part at the vehicle front and vehicle rear, and on the front and rear parts of the upper part, in order to perform a swivel movement in the vehicle width direction. As a result a rotation movement can be performed to compensate for the tipping movements in the vehicle width direction and in the width direction of the vehicle seat and/or vehicle cab. Thus both in the vehicle width direction and in the vehicle length direction, a compensating rotation movement of the vehicle seat and/or vehicle cab is possible.

The swivel movement of the swivelling upper part can be subjected by means of a damper device to a damping force countering the swivel movement to damp the vibration, wherein the damper device is connected with at least one of the lever arms on one side and the lower part on the other. In addition such a damper device can be coupled with a movement device which promotes the opposing rotation movement of the vehicle seat or vehicle cab against the rotation movement of the vehicle.

Further advantageous embodiments arise from the subclaims.

BRIEF DESCRIPTION OF THE DRAWINGS

Benefits and suitable features of the invention are described below in conjunction with the drawing. This shows.

DETAILED DESCRIPTION

Figure 1:
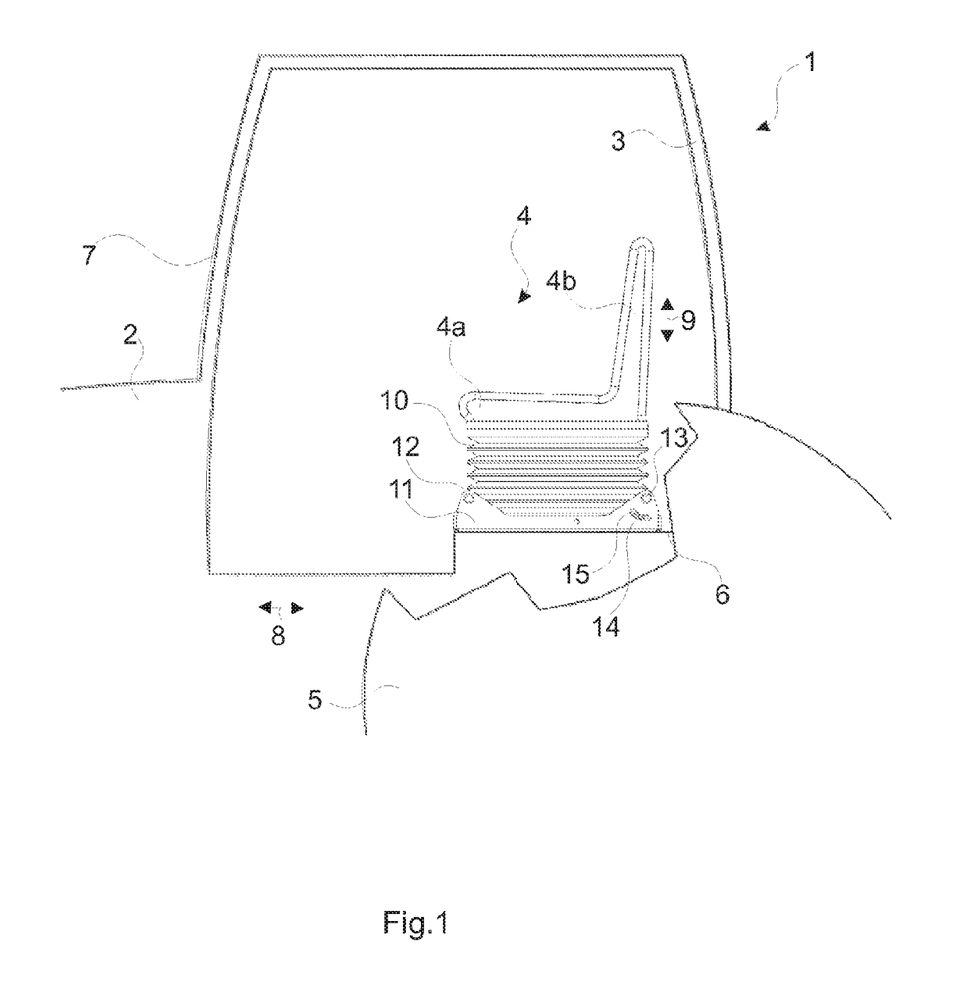
FIG. 1 in a diagrammatic depiction an extract of a truck with a vehicle seat according to a first embodiment of the invention.

FIG. 1 shows in a diagrammatic view an extract from a truck with a vehicle seat according to the first embodiment of the invention. The extract from the truck 1 shows an indicated vehicle body 2 and a vehicle cab 3 in which the vehicle seat 4 according to the invention is arranged according to its first embodiment of the invention.

The vehicle seat 4 is arranged on a part 6 of the vehicle body.

The vehicle has a rear wheel 5 and a windscreen 7.

Previously such a vehicle seat was conventionally equipped only with a conventional longitudinal horizontal springing as vehicle vibration device in addition to vertical springing. This allows only one degree of freedom in the X direction, i.e. the vehicle length direction, for shifting and sprung attenuation of the horizontally introduced vibration. Such conventional longitudinal horizontal springing usually allows a movement of the vehicle seat to the front or rear on a corresponding short interruption or strong drive behaviour of the vehicle. This is shown by the double arrow 8 in the vehicle length direction.

A height adjustment of the vehicle seat and a vibration movement oriented exclusively in the vertical direction is shown by the double arrow at reference numeral 9.

The vehicle seat 4 according to the invention has a seat surface 4a and a back rest 4b which together form a vehicle seat upper part and are attached vibrating with the vehicle seat lower part 11 by means of two scissor arms not shown here in detail and placed within a gaiter 10.

The vehicle seat lower part 11 has swivel bearings with first swivel axes 12, 13 on which the vehicle seat upper part 4a, 4b is suspended, rocking and oscillating, by means of two swivel axes 14 and a further second swivel axis not shown here which is allocated to the first swivel axis 12.

The second swivel axis 14 moves within an arc-shaped curved track 15 which by its course specifies the swivel movement or rotation movement of the vehicle seat upper part in relation to the vehicle seat upper part.

Figure 2A:
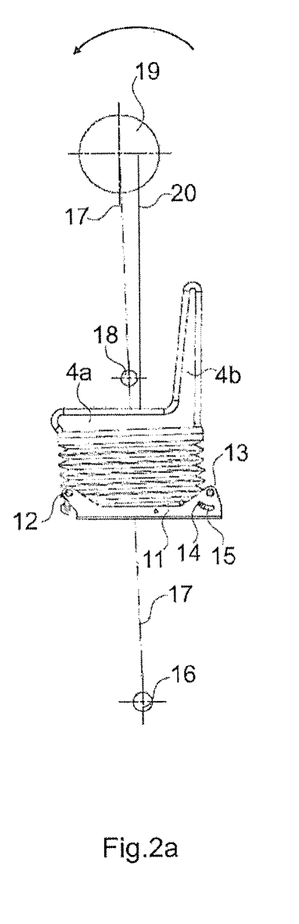
FIGS. 2a, 2b and 2c in a diagrammatic depiction a vehicle seat according to the first embodiment of the invention in various swivel positions.
Figure 2B:
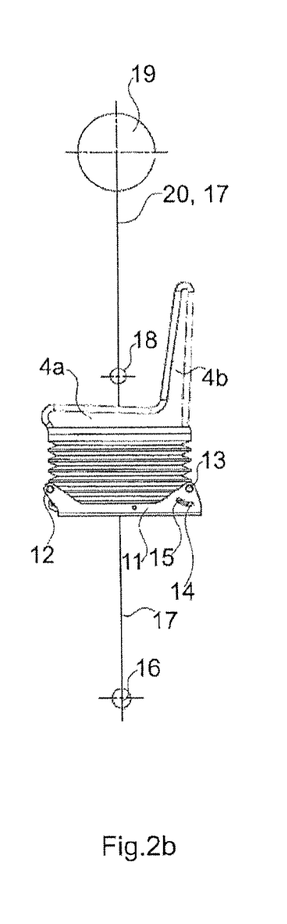
Figure 2C:
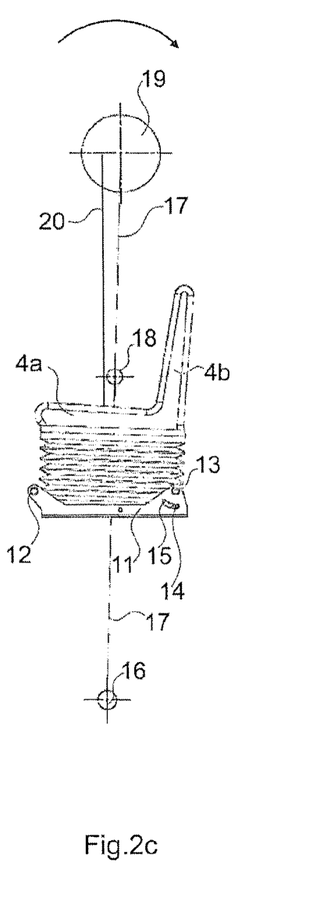

FIGS. 2a, 2b and 2c show in a diagrammatic side view various swivel positions of the vehicle seat according to the invention in a first embodiment. In FIG. 2b the vehicle seat 4 with its seat surface 4a and back rest 4b is shown in unswivelled position i.e. neither tipped forward nor backward.

Because of the suspended mounting by means of the swivel mounts, the vehicle seat can be swivelled forward and back with swivel axes 12, 13, 14 and further elements described in connection with FIGS. 3a and 3b. This swivel movement takes place automatically when the rest of the vehicle executes an opposite swivel movement because of unevenness of the road surface.

For example according to FIG. 2a, a vehicle drives over a bump with its front wheels so that the vehicle tips up in its front region. At the same time, because of the swivelling mounting, the vehicle seat describes a rotation movement of its lower part 11 in relation to the vehicle seat upper part so that the vehicle seat upper part remains almost horizontal in its position. This is indicated by the forward tilted head 19 of a vehicle seat user and the forward swivelled connecting line 17 between the head 19, a pivot point 16 about which the swivel movement takes place—wherein this swivel point or swivel axis can be fictitious—and an SIP point (seat index point) 18.

FIG. 2a shows the forward deflection of the vehicle seat and FIG. 2c the rearward deflection of the vehicle seat. A swivelling of the vehicle seat takes place about swivel axis 16 which should be regarded as the virtual axis.

A head 19 is connected via a common line 17 with swivel axis 16 and SIP point 18 and shows that a deviation in the position of the person on the seat surface 4a occurs in its angle from the vertical 20. This deviation exists when the vehicle passing through a hollow tips down in its front region or when passing over a bump tips up in the front region and as a result the vehicle seat in relation to the rest of the vehicle is either swivelled to the back in FIG. 2c or to the front as in FIG. 2a.

Figure 3A:
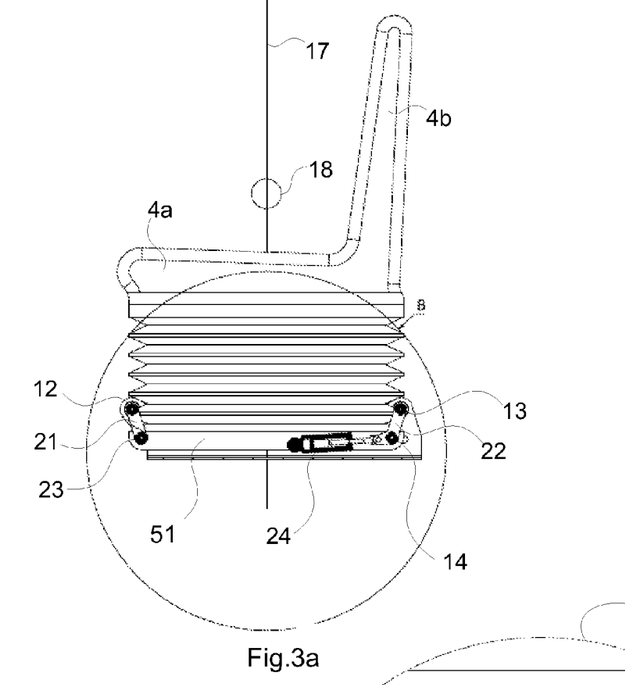
FIGS. 3a and 3b the vehicle seat according to the first embodiment of the invention in diagrammatic depiction with technical details, also in an extract view.
Figure 3B:
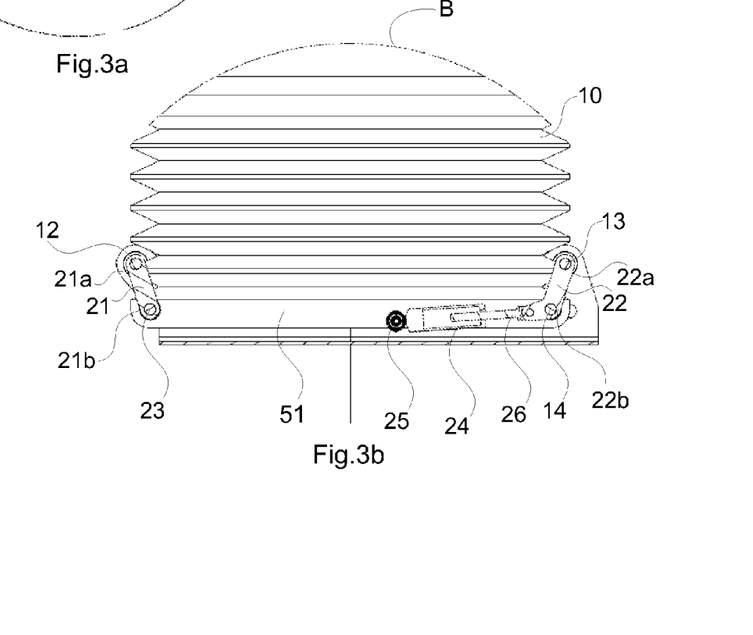

FIGS. 3a and 3b show technical details of the vehicle seat according to the first embodiment of the invention which is depicted in a side view together with an extract view in FIG. 3b.

As is evident from the depictions in FIGS. 3a and 3b, the swivel mountings which are arranged on the front and rear oriented in the trapezoid form shown and attached to the seat on both the left and right, comprise first swivel axes 12 and 13 and second swivel axes 23, 14.

The first swivel bearing in the front area with swivel axes 12 and 23 has a lever arm 21 which connects the two swivel axes 12 and 23 together. The swivel axis 12 is swivellably mounted in a section of the lower part 11 of the vehicle seat, not shown in more detail because of the cross section view, and with a side component 51 of the seat upper part arranged between the side frames of the lower part 11. This also applies to the second swivel mounting with swivel axes 13, 14 and lever arm 22. In this way almost the entire seat is mounted rocking in the seat lower part, in particular because the lever arms 21 and 22 are oriented pointing towards each other viewed downwards. Thus the vehicle seat is constantly swinging back within the lower part 11.

In addition a damping device 24 is arranged on the second swivel bearing whereby the second swivel bearing comprises the lever arm 22 in curved form.

The damper device 24 is advantageously mounted pivoting at a point 25 and allows damping of the swivel movements of the vehicle seat to compensate for the pitching movements of the vehicle. For this the damper device 24 is attached with a piston 26 to the curved lever arm 22.

The lever arms 21 and 22 preferably have first and second swivel axes at their first and second ends 21a, 21b, 22a, 22b. However it also conceivable for the swivel axes to be spaced more from the ends 21a, 21b, 22a and 22b of the lever arms 21 and 22.

By the arrangement of the swivel axis 14 within a curved track, not shown in detail here, which is arranged in the vehicle seat lower part 11 and for example can be seen with reference numeral 15 in FIG. 1, the rocking motion of the vehicle seat is executed to compensate for the pitching movement of the vehicle on the specified curve or arc shape. This allows targeted control of the swivel movement and hence influencing of a fictitious pivot point or pivot axis about which the vehicle seat is swivelled.

Figure 4:
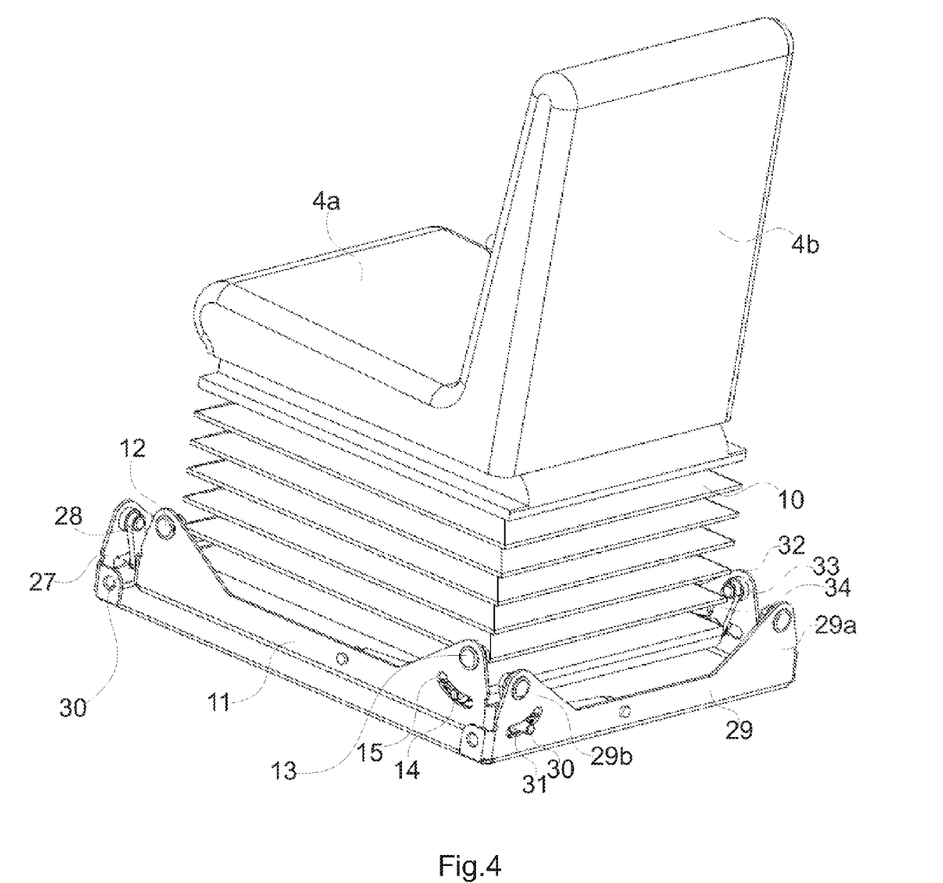
FIG. 4 in a perspective diagrammatic depiction the vehicle seat according to a further second embodiment of the invention.

FIG. 4 shows in a perspective view the vehicle seat according to a second embodiment of the invention. The same and similar components have the same reference numerals.

It is clear from this depiction that the vehicle seat differs from the vehicle seat in the first embodiment in that in addition to the side swivel mountings 12, 13 acting in the longitudinal horizontal direction which are arranged at the ends 11a and 11b of the seat lower part 11, additional swivel mountings are provided on the front and rear walls 27, 29 of the lower part which act in the vehicle width direction, i.e. the vehicle seat width direction. This allows tipping movements of the vehicle in the lateral direction to be compensated by such a vehicle seat.

Further swivel mountings are also fitted with levers 28 and swivel axes 30 and 30a and are arranged in the rear area at ends 29b and 29a of the rear wall 29 of the lower part.

Additional swivel mountings which act in the horizontal direction are shown with a swivel axis 33 and a lever arm 34 which are also arranged on an upwardly directed protrusion 32 of the lower part 11.

FIGS. 5a, 5b and 5c again show in a side view the vehicle seat according to the second embodiment of the invention in various swivel positions which act in the longitudinal direction of the vehicle and the vehicle seat.

Figure 5A:
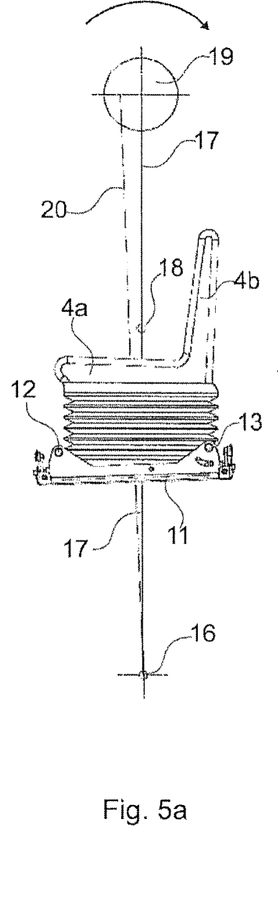
FIGS. 5a, 5b and 5c the vehicle seat according to FIG. 4 in a side view in various swivel positions.
Figure 5B:
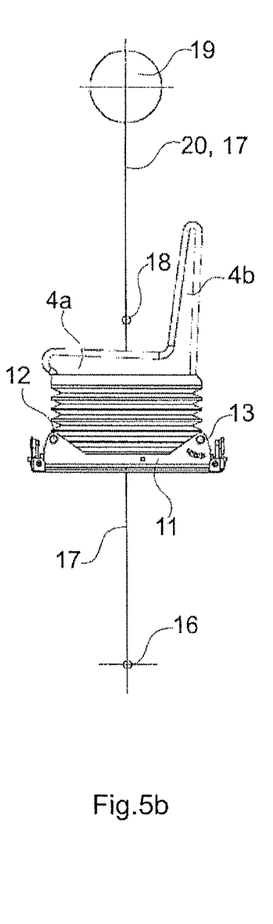
Figure 5C:
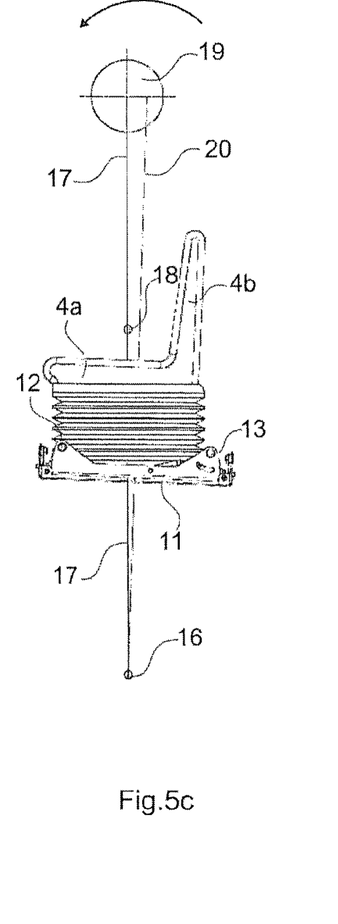

It is clear from these depictions that the line 17 indicating a Z axis of the vehicle seat and connecting a head 19 with a SIP point 18 (centre of gravity) with a swivel axis 16, has a different orientation in FIGS. 5a and 5c from line 20 which indicates a Z axis of the vehicle. So in FIG. 5a the swivel movement of the vehicle seat is shown in relation to the vehicle when the vehicle with its front axle drives through a dip and as a result it executes a swivel movement forwards. The vehicle seat 4 however with its seat surface 4a remains in the horizontal so that a deviation occurs between lines 17 and 20.

In FIG. 5c in contrast the front axle of the vehicle passes over a bump. At the same time the vehicle seat in seat surface 4a remains in the horizontal, while the vehicle seat lower part 11 undergoes a swivel movement to the rear due to passing over the bump. This is also indicated by comparison of the two lines 17 and 20.

Figure 6:
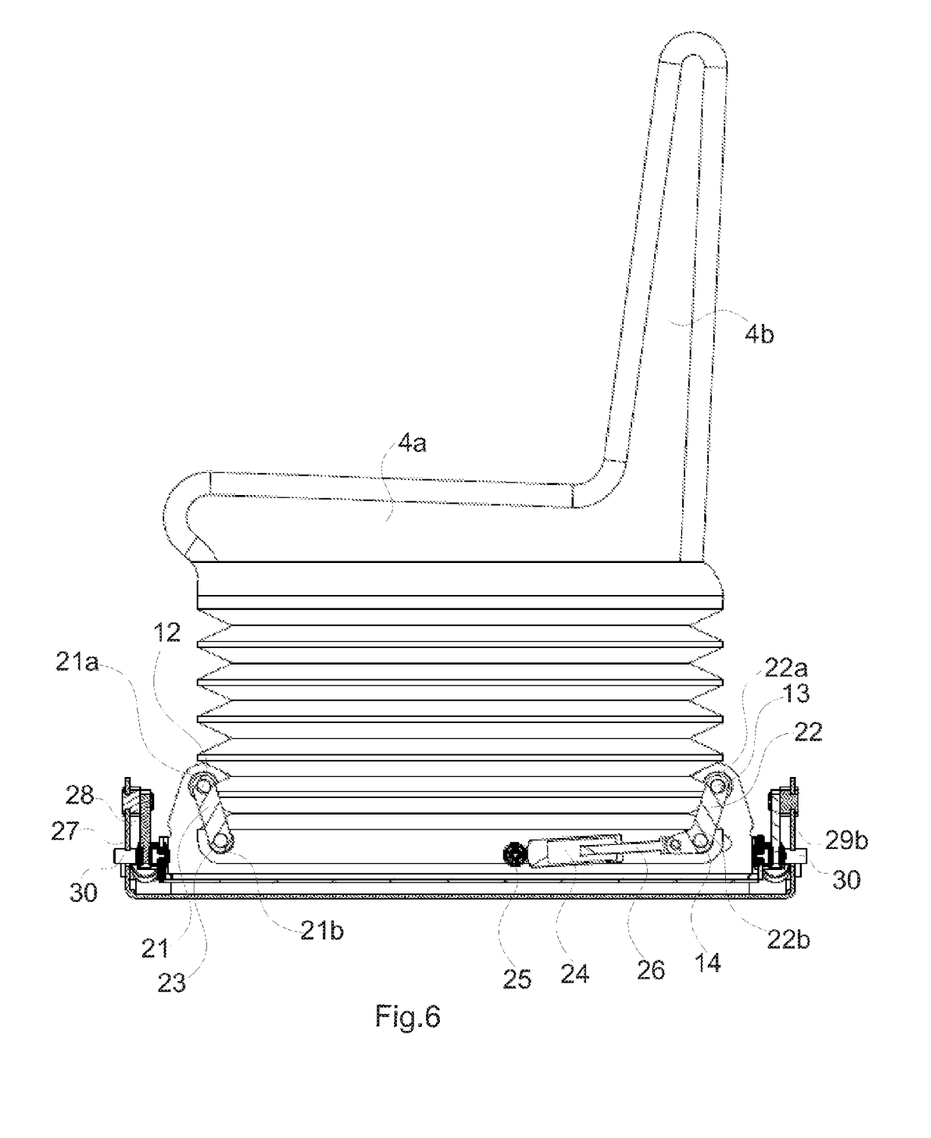
FIG. 6 the vehicle seat in a partly reproduced cross section depiction according to the second embodiment of the invention.

FIG. 6 shows technical details in a partial cross section view together with a side view of the vehicle seat. It is clear from this depiction that a second swivel axis 30a, belonging to the swivel mounting for a swivel movement acting in the vehicle width direction or vehicle seat width direction, is also arranged inside an arc-shaped curved track. This also applies to the second swivel axis 30 in the front area of the vehicle seat. Otherwise the same and similar components carry the same reference numerals as the vehicle seat in the first embodiment.

Figures 7A, 7B:
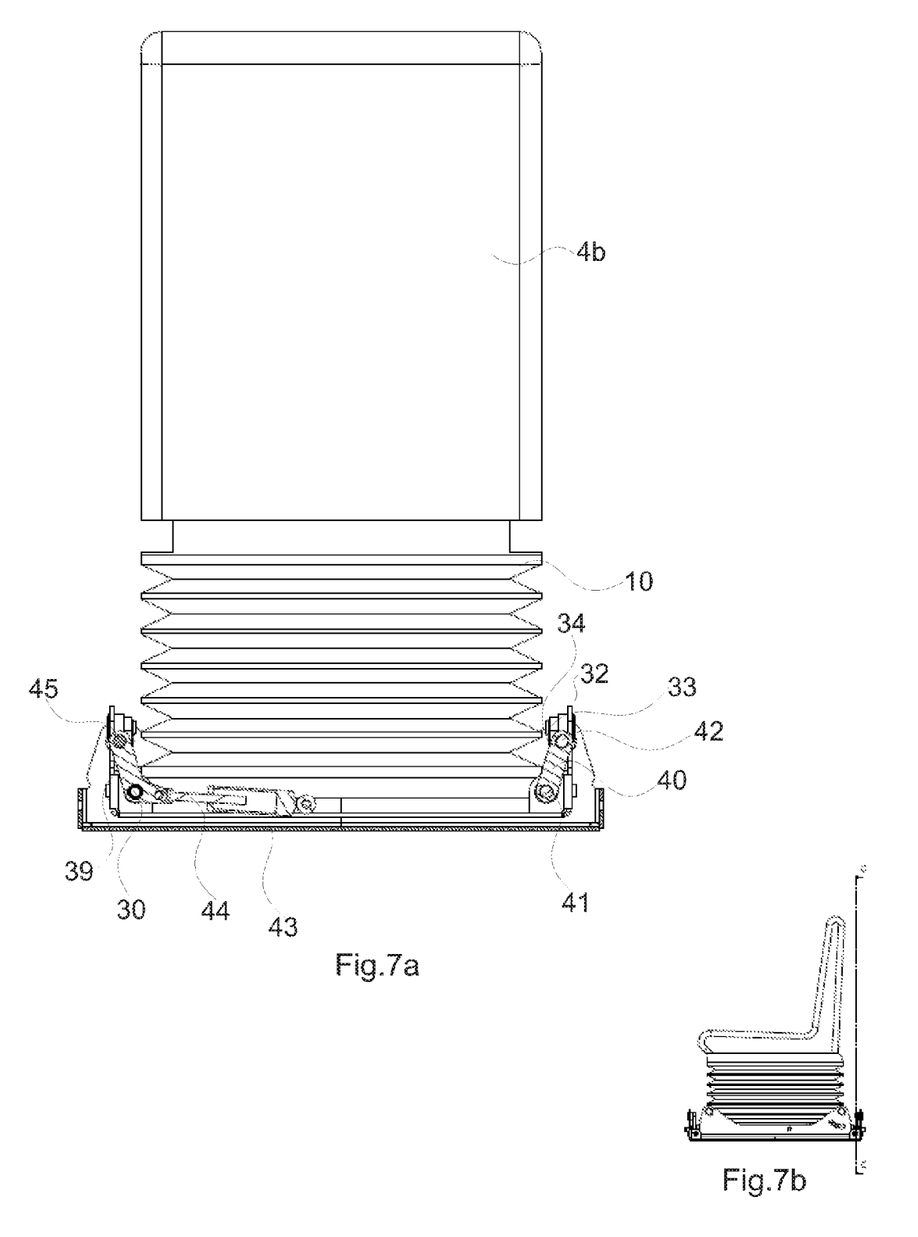
FIGS. 7a and 7b the vehicle seat according to the second embodiment of the invention in a diagrammatic rear view.

FIG. 7a shows the vehicle seat according to a second embodiment of the invention in a partial cross section view, in particular in a lower area as indicated by a cross section view along line C-C in FIG. 7b.

It is clear from the view in FIG. 7a that in the rear area of the vehicle seat there are also lever arms 39 and 40 present in the same way as in the swivel bearings acting in the longitudinal horizontal direction. With these swivel bearings shown which act in the side direction or vehicle seat width direction, the two levers 39 and 40 are arranged in the known manner by means of swivel axes 45, 30 and 42, 41 on the lower part and on components of the vehicle seat upper part. Also a damper device 43 is shown with a piston 44, wherein the piston 44 is also connected with the curved lever arm 39 already described which is swivellable about the swivel axis 30.

Figure 8A:
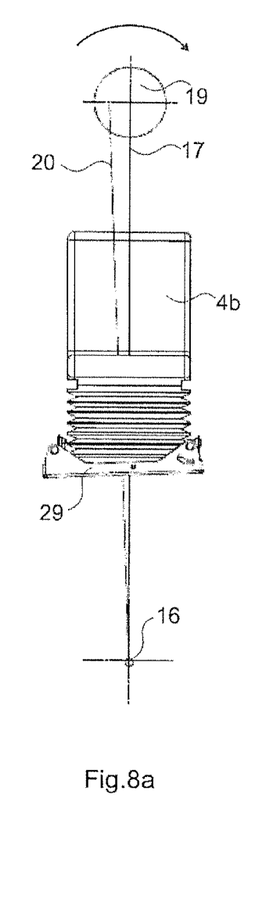
FIGS. 8a, 8b and 8c the vehicle seat according to the second embodiment of the invention in diagrammatic view from the rear in various swivel positions oriented in the vehicle width direction.
Figure 8B:
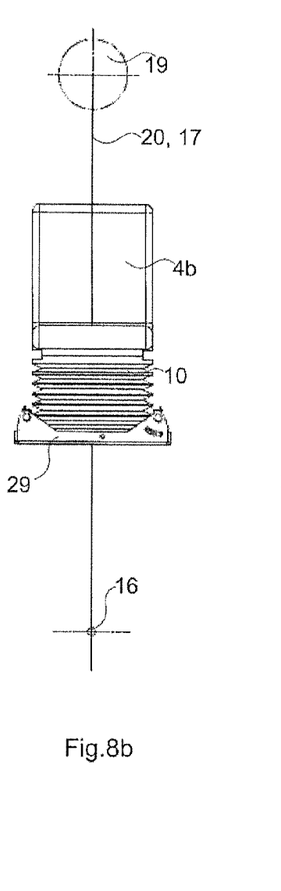
Figure 8C:
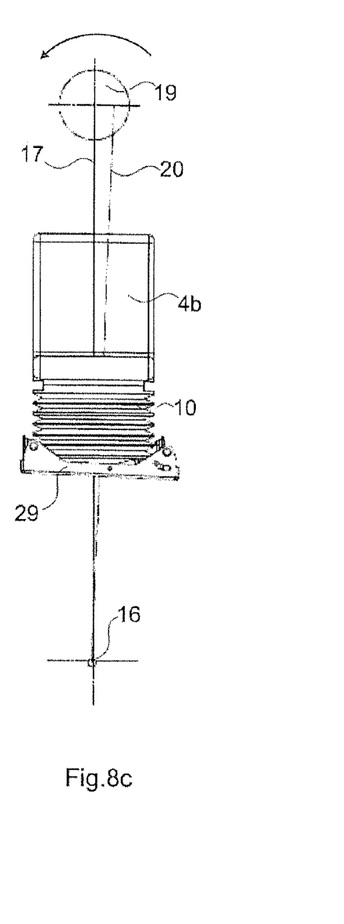

FIGS. 8a, 8b and 8c show the vehicle seat according to a second embodiment of the invention in various swivel positions which act in the vehicle width direction. It is clear from these views again that on a side vehicle deflection to the left, the vehicle seat axis or driver's seat axis 17 shows a deviation in relation to the vehicle axis 20. Also FIG. 8c shows that in the opposite direction, the vehicle seat axis 17 is oriented to the left in relation to the vehicle axis 20 by an angle i.e. because of the movement of the vehicle to the right, the vehicle axis 20 is also tilted to the right.

All lever arms can also be replaced for example by belts or similar parts.

All features disclosed in the application documents are claimed as essential to the invention where novel individually or in combination in relation to the prior art.

REFERENCE NUMERAL LIST

3 Vehicle cab
4 Vehicle seat
4a Seat surface
4b Back rest
8 Vehicle longitudinal direction
9 Double arrow
10 Gaiter
11 Vehicle seat lower part
12 Swivel axis
13 Swivel bearing
14 Swivel bearing
15 Curved track
16 Swivel point
17 Connecting line
18 SIP point
19 Head
20 Vertical
21 Lever arm
21a End
21b End
22 Lever arm
22a End
22b End
23 Swivel axis
24 Damper device
25 Point
26 Piston
27 Wall
28 Lever
29 Wall
29a End
29b End
30 Swivel axis
30a Swivel axis
31 Curved track
32 Protrusion
33 Swivel axis
34 Lever arm
36 Swivel axis
39 Lever
40 Lever
41 Swivel bearing
42 Swivel bearing
43 Damper device
44 Damper device
45 Swivel bearing
50 Curved track
51 Side component

The invention claimed is:

1. A vehicle seat, comprising:
a lower part;
an upper part mounted in relation to the lower part by at least one damper device, wherein the upper part is mounted to and suspended on the lower part so that the upper part is configured to pivot about a virtual axis arranged below the upper part and extending in a width direction or a length direction;

a first plurality of lever arms including, at least, a first lever arm and a second lever arm, wherein a first end of the first lever arm of the first plurality of lever arms is attached to the lower part at a first swivel axis, wherein a second end of the first lever arm of the first plurality of lever arms is attached to the upper part at a third swivel axis, wherein a first end of the second lever arm of the first plurality of lever arms is attached to the lower part at a second swivel axis, wherein a second end of the second lever arm of the first plurality of lever arms is attached to the upper part at a fourth swivel axis, and wherein for each of the first and second lever arms of the first plurality of lever arms, the second end lies below the first end;

a base, the base including a front wall and a rear wall;

a second plurality of lever arms including, at least, a first lever arm and a second lever arm, wherein a first end of the first lever arm of the second plurality of lever arms is attached to the base at a fifth swivel axis, wherein a second end of the first lever arm of the second plurality of lever arms is attached to the lower part at a seventh swivel axis, wherein a first end of the second lever arm of the second plurality of lever arms is attached to the base at a sixth swivel axis, wherein a second end of the second lever arm of the second plurality of lever arms is attached to the lower part at an eighth swivel axis, and wherein for each of the first and second lever arms of the second plurality of lever arms, the second end lies below the first end, a curved track arranged on the lower part, wherein the third swivel axis is configured to slide within the curved track arranged on the lower part, and wherein the curved track defines a maximum possible swivel movement of the upper part relative to the lower part; and wherein the front and rear walls of the base define a space in between, and wherein the lower part is suspended within the space in between the front and rear walls.

2. The vehicle seat according to claim 1, wherein the lower part includes an upwardly extending left side wall arranged on a left side of the vehicle seat and an upwardly extending right side wall arranged on a right side of the vehicle seat, wherein the first swivel axis passes through at least one of the upwardly extending left side wall of the lower part and the upwardly extending right side wall of the lower part towards a front area of the vehicle seat, and wherein the third swivel axis passes through at least one side component of the upper part arranged between the upwardly extending left side wall of the lower part and the upwardly extending right side wall of the lower part.

3. The vehicle seat according to claim 1, wherein the lower part includes an upwardly extending left side wall arranged on a left side of the vehicle seat and an upwardly extending right side wall arranged on a right side of the vehicle seat, wherein the first swivel axis passes through at least one of the upwardly extending left side wall of the lower part and the upwardly extending right side wall of the lower part towards a rear area of the vehicle seat, and wherein the third swivel axis passes through at least one side component of the upper part arranged between the upwardly extending left side wall of the lower part and the upwardly extending right side wall of the lower part.

4. The vehicle seat according to claim 1, wherein the first and second swivel axes pass through left and right side walls of the lower part, and wherein the third and fourth swivel axes pass through left and right components of the upper part, to permit a pivotal movement in the length direction.

5. The vehicle seat according to claim 1, wherein a movement of the upper part relative to the lower part is subjected to a damping force by the at least one damper device in order to damp out vibration, and wherein the at least one damper device is connected with the upper part and with one of the first and second lever arms of the first plurality of lever arms.

6. The vehicle seat according to claim 1, wherein the lower part is configured to be connected with at least one of a vehicle body part, a frame, and a vehicle cab part.

7. A device, comprising:

a base, the base including a first wall and a second wall, wherein a space is defined between the first wall and the second wall;

a lower part;

an upper part mounted in relation to the lower part, wherein the upper part is mounted to and suspended from the lower part so that the upper part is configured to pivot about a virtual axis arranged below the upper part and extending in a device width direction or a device length direction;

a first plurality of lever arms including a first lever arm, wherein a first end of the first lever arm of the first plurality of lever arms is attached to the lower part at a first swivel axis and a second end of the first lever arm of the first plurality of lever arms is attached to the upper part at a second swivel axis, wherein the second end of the first lever arm of the first plurality of lever arms lies below the first end of the first lever arm of the first plurality of lever arms, wherein a curved track is arranged on the lower part, wherein the second swivel axis is configured to move within the curved track, and wherein the curved track defines a maximum possible movement of the upper part relative to the lower part;

a second plurality of lever arms including a first lever arm, wherein a first end of the first lever arm of the second plurality of lever arms is attached to the base at a third swivel axis and a second end of the first lever arm of the second plurality of lever arms is attached to the lower part at a fourth swivel axis, wherein the second end of the first lever arm of the second plurality of lever arms lies below the first end of the first lever arm of the second plurality of lever arms, and wherein the lower part is suspended within the space in between the first and second walls of the base.

8. The device according to claim 7, wherein the lower part includes an upwardly extending left side wall arranged on a left side of the device and an upwardly extending right side wall arranged on a right side of the device, wherein the first swivel axis passes through at least one of the upwardly extending left side wall of the lower part and the upwardly extending right side wall of the lower part toward a front area of the device, and wherein the second swivel axis passes through at least one side component of the upper part arranged between the upwardly extending left side wall of the lower part and the upwardly extending right side wall of the lower part.

9. The device according to claim 7, wherein the third swivel axis passes through at least one of the first and second walls of the base.

10. The device according to claim 7, wherein the lower part includes a left side wall and a right side wall, wherein the first and second swivel axes are arranged perpendicular to the left and right side walls of the lower part to permit a pivotal movement in the device length direction.

11. The device according to claim 7, wherein a movement of the upper part relative to the lower part is subjected to a damping force by a damper device in order to damp out vibration, wherein the damper device is connected with the upper part and with the first lever arm of the first plurality of lever arms.

12. A device, comprising:
a lower part;
an upper part;
a first set of lever arms including a first lever arm, a second lever arm, a third lever arm, and a fourth lever arm,
wherein the upper part is suspended from the lower part by the first set of lever arms,
wherein the first and second lever arms of the first set of lever arms are connected to the lower part at a first swivel axis,
wherein the third and fourth lever arms of the first set of lever arms are connected to the lower part at a second swivel axis,
wherein the first and second lever arms of the first set of lever arms are connected to the upper part at a third swivel axis,
wherein the third and fourth lever arms of the first set of lever arms are connected to the upper part at a fourth swivel axis,
wherein the first, second, third, and fourth swivel axes are parallel to one another;
a first damper including a first end and a second end, wherein the first damper is pivotally mounted to one of the first and second lever arms of the first set of lever arms at the first end of the first damper, and wherein the first damper is pivotally mounted to the upper part at the second end of the first damper;
a base, the base including a first wall and a second wall;
a second set of lever arms including a first lever arm, a second lever arm, a third lever arm, and a fourth lever arm,
wherein the lower part is suspended from the base by the second set of lever arms,
wherein the first and second lever arms of the second set of lever arms are connected to the base at a fifth swivel axis,
wherein the third and fourth lever arms of the second set of lever arms are connected to the base at a sixth swivel axis,
wherein the first and second lever arms of the second set of lever arms are connected to the lower part at a seventh swivel axis,
wherein the third and fourth lever arms of the second set of lever arms are connected to the lower part at an eighth swivel axis,
wherein the fifth, sixth, seventh, and eighth axes are parallel to one another;
a curved track, wherein a location of the curved track is fixed relative to the lower part, and wherein the third swivel axis is moveable within the curved track; and
wherein the first and second walls of the base define a space in between, and wherein the lower part is suspended in the space in between in the first and second walls of the base.

13. The device according to claim 12, wherein the first, second, third, and fourth swivel axes are perpendicular to the fifth, sixth, seventh, and eighth swivel axes.

14. The device according to claim 13, further comprising:
a second damper, wherein a first end of the second damper is connected to one of the first and second lever arms of the second set of lever arms, and wherein a second end of the second damper is connected to the lower part.

15. The device according to claim 12, wherein the first and second sets of lever arms are intersected by a common plane.

* * * * *